United States Patent
Bosscher et al.

(10) Patent No.: US 10,065,313 B2
(45) Date of Patent: Sep. 4, 2018

(54) ROBOT MANIPULATOR SYSTEM

(71) Applicant: HARRIS CORPORATION, Melbourne, FL (US)

(72) Inventors: Paul M. Bosscher, West Melbourne, FL (US); Matthew D. Summer, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 142 days.

(21) Appl. No.: 15/372,102

(22) Filed: Dec. 7, 2016

(65) Prior Publication Data

US 2018/0154521 A1 Jun. 7, 2018

(51) Int. Cl.
  *G05B 19/04* (2006.01)
  *B25J 9/16* (2006.01)
  *B25J 15/04* (2006.01)

(52) U.S. Cl.
  CPC ......... *B25J 9/1664* (2013.01); *B25J 15/0483* (2013.01); *G05B 2219/39468* (2013.01)

(58) Field of Classification Search
  CPC ............... B25J 9/1664; B25J 15/0483; G05B 2219/39468
  See application file for complete search history.

(56) References Cited

U.S. PATENT DOCUMENTS

| | | | |
|---|---|---|---|
| 4,547,858 A * | 10/1985 | Horak | B25J 9/1648 318/568.11 |
| 4,604,787 A | 8/1986 | Silvers, Jr. | |
| 4,766,775 A | 8/1988 | Hodge | |
| 5,294,873 A * | 3/1994 | Seraji | B25J 9/1638 318/561 |
| 5,377,310 A * | 12/1994 | Jain | B25J 9/1615 700/260 |
| 5,430,643 A * | 7/1995 | Seraji | B25J 9/1643 318/568.11 |
| 6,725,101 B2 * | 4/2004 | Sanchez | G05B 13/0265 700/261 |
| 6,774,885 B1 * | 8/2004 | Even-Zohar | A61B 5/1036 345/156 |

(Continued)

OTHER PUBLICATIONS

Gueta, L., et al., "Design of the end-effector tool attachment for robot arm with multiple reconfigurable goals," 2008 IEEE International Conference on Automation Science and Engineering, Aug. 23-26, 2008, pp. 876-881, 978-1-4244-2012-0/08, copyright 2008 IEEE.

(Continued)

*Primary Examiner* — Ian Jen
(74) *Attorney, Agent, or Firm* — Fox Rothschild LLP; Robert J. Sacco; Carol E. Thorstad-Forsyth

(57) ABSTRACT

Robotic manipulator arm has an end portion to which one or more end effector appliances can be operably mounted for performing one or more manipulator arm operations. A control system has access to a plurality of different end effector appliance parameter sets which are respectively associated with the plurality of different end effector appliances. A user interface facilitates identification to the control system of one or more of the different end effector appliances which are installed on the manipulator arm. The control system is responsive to the identification to modify a control algorithm.

22 Claims, 6 Drawing Sheets

(56) References Cited

U.S. PATENT DOCUMENTS

| | | |
|---|---|---|
| 2010/0030233 A1 | 2/2010 | Whitman et al. |
| 2012/0298706 A1 | 11/2012 | Gordon et al. |
| 2016/0242859 A1 | 8/2016 | Toth et al. |
| 2018/0154521 A1* | 6/2018 | Bosscher ............... B25J 9/1664 |

OTHER PUBLICATIONS

Gueta, L., et al., "Multiple-goal task realization utilizing degrees of freedom of task and tool attachment optimization," 2011 IEEE International Conference on Robotics and Automation, May 9-13, 2011, pp. 1714-1719, 978-1-61284-385-8/11, copyright 2011 IEEE.
Extended European Search Report dated May 11, 2018 for European Application No. 17001944.2-1205.
Siciliano, B., et al., "Robotics: Modelling, Planning and Control," Robotics, Dec. 31, 2009, Springer, London, XP055470430, ISSN: 1439-2232; ISBN: 978-1-84628-642-1.

* cited by examiner

ROBOT MANIPULATOR SYSTEM

BACKGROUND

Statement of the Technical Field

The inventive arrangements relate to robotic systems, and more particularly to control system which are used for controlling robotic manipulators.

Description of the Related Art

A robotic manipulator is a device which is commonly used for performing certain robotic manipulation tasks based on operator inputs. As such, a robotic manipulator is generally mounted to a base and is comprised a plurality of jointed segments forming a manipulator arm. The plurality of jointed segments are movable by actuators responsive to a control system. For example, the control system can receive inputs from a user by means of a suitable control system interface. An end effector appliance is disposed at a location on the robotic arm which is usually distal from the base to facilitate various tasks. The end effector appliance is usually designed to interact with the environment in some way. Examples of appliances used for this purpose can include a gripper, a wire cutter, a water disruptor, water jet cutters, snagging tools and sensor (e.g. chemical or X-ray sensors).

SUMMARY

Embodiments concern a robotic manipulator and a method for controlling same. A robotic manipulator has a base on which is mounted a manipulator arm. The manipulator arm has two or more segments which are respectively connected by joints. The joints facilitate movement of the various segments relative to the base in response to one or more joint actuators. The manipulator arm has an end portion distal from the base to which one or more end effector appliances can be operably mounted for performing one or more manipulator arm operations. A control system is provided to control the operation of the joint actuators. The control system has access to a plurality of different end effector appliance parameter sets which are respectively associated with the plurality of different end effector appliances. A user interface facilitates identification to the control system of one or more of the different end effector appliances which are installed on the manipulator arm. The control system is responsive to the identification to dynamically modify a control algorithm which is used to control the plurality of joint actuators.

More particularly, the manipulator arm can have a controlled end point which is associated with the end portion of the manipulator arm or an end effector attached thereto. The control system is configured to use the controlled end point as a basis to translate manipulator arm control signals received from a user interface to control signals which are communicated to the plurality of joint actuators. The dynamic modification of the control algorithm described herein automatically changes at least one of a location and an orientation of the controlled end point as recognized by the control system from a reference end point to a modified end point. The modified end point is determined based on an installed end effector appliance parameter set. The installed end effector appliance parameter set will correspond to a particular one of the plurality of end effector appliances which has been identified to the control system as having being installed on the manipulator arm.

The control system uses the dynamically modified control algorithm to calculate an optimal joint velocity command for controlling the one or more joint actuators. The optimal joint velocity command is determined by a constrained optimization. More particularly, a constrained optimization process is used to minimize the difference between actions that are commanded through a user interface and actions that are permitted for the manipulator arm, given the set of joint limits and constraint functions which are to be applied.

The change in the location and/or the orientation of the controlled end point are respectively specified by a position offset parameter and a rotation offset parameter which are included in the installed end effector appliance parameter set. Further, one or both of the position offset parameter and the rotation offset parameter can be functionally dependent on a variable displacement of a portion of the end effector appliance. This displacement, which is relative to the end portion of the manipulator arm, is specified in accordance with one or more displacement parameters. Accordingly, the controlled end point which is used by the control algorithm for joint actuator control functions can be dynamically variable (while the end effector appliance is installed) in accordance with the variable displacement.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Figure 1:
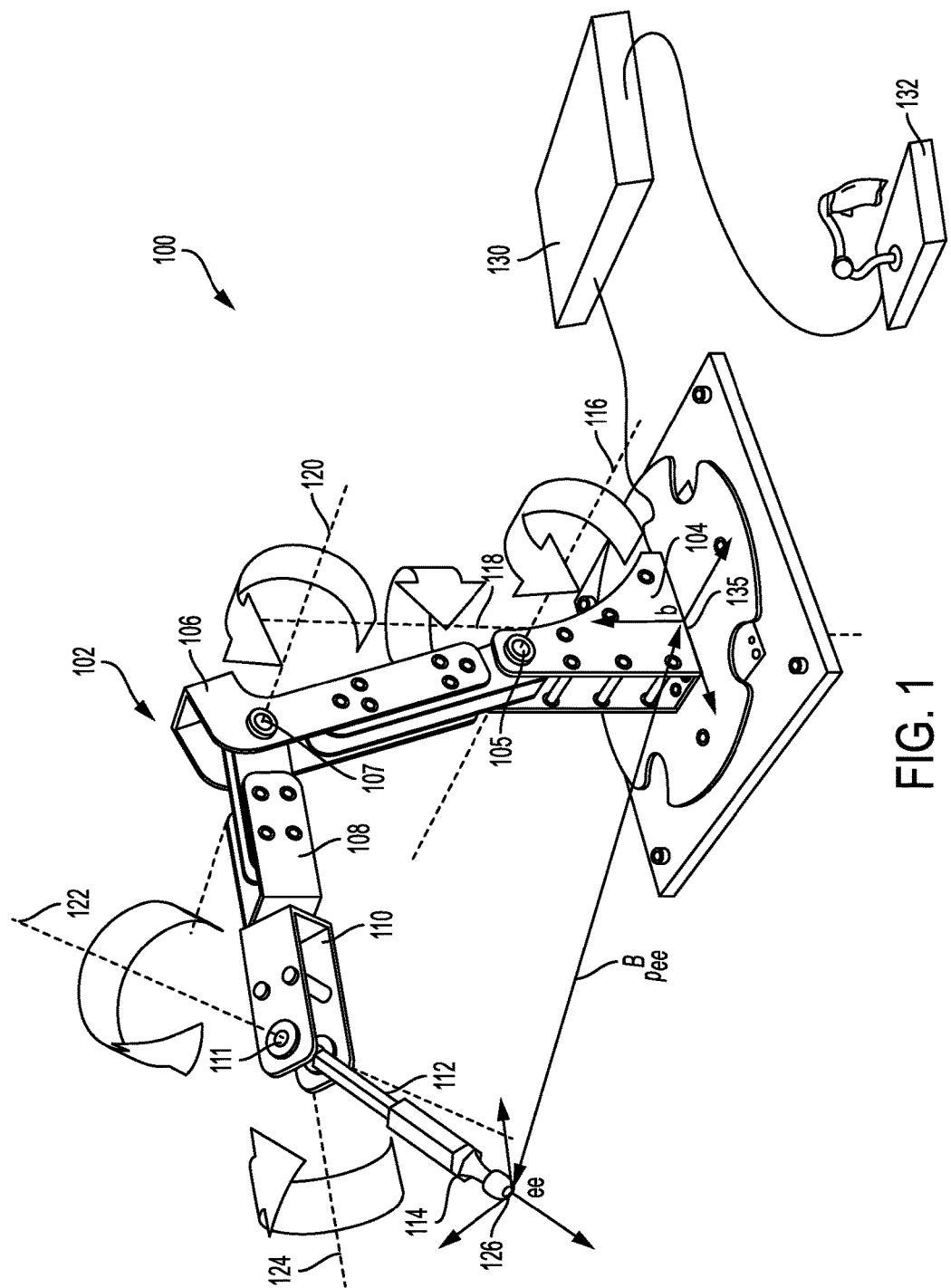
FIG. 1 is a drawing that is useful for understanding certain features of a robotic manipulator control system.

Embodiments disclosed herein concern a robotic manipulator. As shown in FIG. 1, a robotic manipulator 100 is comprised of a manipulator arm 102 mounted to a base 104. The manipulator arm 102 is comprised a plurality of jointed segments 106, 108, 110, 112. The plurality of jointed segments are movable about a plurality of axes 116, 118, 120, 122, 124 by joint actuators 105, 107, 111 which are responsive to a control system 130. For example, the control system 130 can receive inputs from a user by means of a suitable control system user interface 132. Exemplary joint actuators used for controlling the movement of the jointed segments can be electric motors, hydraulic actuators and pneumatic actuators.

An end effector appliance 114 is disposed at an end location on the robotic arm distal from the base to facilitate various tasks. The end effector appliance is a device designed to interact with the environment in some way so as to facilitate robotic tasks. Examples of end effector appliances used for this purpose can include without limitation a gripper, a wire cutter, a water disruptor, water jet cutters, snagging tools and sensor (e.g. chemical or X-ray sensors). For convenience, end effector appliances will sometimes be referred to herein more simply as appliances.

In a most basic type of manipulator control system, the user can directly control individual joints of the arm. No control system assistance is provided so all of the burden is on the operator to determine how each joint must be moved so as to achieve a desired position or action of the manipulator arm. The user basically has direct control over each actuator which control the operation of each joint. In more advanced systems, the control system coordinates joint movement in response to user inputs, where the user inputs specify only how a distal end 126 of the end effector disposed on the manipulator arm is to move relative to its base 104. In such scenarios, the distal end 126 can be understood to be a controlled end point of the manipulator arm. With this type control system, the user only has an indirect control over the operation of each joint. The control relationship can be expressed as:

$$\dot{x}_{arm} = J\dot{\theta}_{cmd}$$

where:
$\dot{x}_{arm}$ is the linear/angular velocity of the controlled end point, given the joint velocities,
J is the Jacobian matrix for the arm (to the end effector), and
$\dot{\theta}_{cmd}$ is the column vector of joint velocities which have been commanded by the user.

The controlled end point is typically the end tip of a grasping device or other tool disposed on the end of the robotic arm. But these control systems offer no flexibility for accommodating other types of end effector appliances, which can have physical characteristics, capabilities and constraints which differ from a baseline or reference appliance (such as a robotic gripper).

The foregoing limitation in conventional manipulator control systems results in greater complexity of operation from the user perspective, particularly in situations where the manipulator is used for a variety of different tasks. In such scenarios, the operator may need to quickly transition among several different end effector appliances to facilitate different operations. Accordingly, a baseline or reference appliance can be replaced (or added to) by a plurality of different appliances, each having different physical characteristics, capabilities and constraints which are pertinent to control system operations. So the distal end of the installed end effector appliance which needs to be controlled may actually be different as compared to the controlled end point as understood by the control system.

In other scenarios, a plurality of end effector appliances can be concurrently disposed on the manipulator arm. In that case, some of the end effector appliances may interfere with (or be limited in their operation) by other end effector appliances which are also installed. Further, the installation of some end effector appliances can be temporary so that any such interference with other appliances may be limited in duration and depend on the total set of appliances present at any one time. It should also be noted that some appliances are moveable in their mounts on the manipulator arm from a first configuration to a second configuration. So the potential for interference with other appliances can depend on the current position/configuration of the appliance.

A further issue which can arise when transitioning to different end effector devices when using the same manipulator arm concerns cameras which are needed to observe or coordinate the operations of the end effector appliance. These cameras are commonly mounted to a portion of the manipulator arm. But a camera which is positioned for observing the operation of a first appliance may not be suitable for observing the operation of a second appliance. The necessary camera angle and/or field of view may be different depending on the particular end effector appliance that is in use.

To overcome these and other limitations, embodiments disclosed herein facilitate simple and efficient control system transitions between operations involving a plurality of end effector appliances which are removably substituted in a mount of a manipulator arm. Embodiments also facilitate manipulator operations in scenarios where a plurality of different end effector appliances are concurrently disposed on the manipulator arm. More particularly, embodiments concern a manipulator system which facilitates unified control of a suite of end effector appliances with minimal operator intervention. The system allows direct control by the operator of the end of any selected end effector appliance, and appliances can be swapped out on the fly. The manipulator automatically configures its control system to account for differences in the physical characteristics, capabilities and constraints of the appliances. The manipulator also automatically selects and/or configures relevant cameras to provide the necessary views of the installed appliance and/or appliances.

As is known, there are a number of characteristics associated with a manipulator which can be used to model its movement. These can include forward kinematics, velocity kinematics, and joint limits. Forward kinematics can be used to find a position/orientation $x_{ee}$ of a distal end 126 of a manipulator arm end-effector in the base coordinate frame given the combination of joint positions, where the base coordinate frame 135 is defined by the location of a base 104 of the manipulator arm. The forward kinematics equation can be expressed as set forth in the following equation (wherein the notation ee is a reference to the distal end of the manipulator arm end effector and B refers to the manipulator arm base):

$$x_{ee} = (x, y, z, \theta_x, \theta_y, \theta_z) = FK_{ee}(\theta) \qquad (1)$$

where
$x_{ee}$ is the position/orientation of the distal end of an end effector disposed on a manipulator arm,
x, y, and z are linear coordinate values of the end effector in the base coordinate frame,
$\theta_x$, $\theta_y$, and $\theta_z$ define an angular rotation of the end effector about the x, y, and z coordinate axes defined by the base coordinate frame, and In the foregoing equation, $FK_{ee}(\theta)$ is the forward kinematics of the end effector expressed as a function of the combination of manipulator joint angles and is commonly found by means of the homogenous transform $$T_{ee}^B = \begin{bmatrix} R_{ee}^B & p_{ee}^B \\ 0 & 0 & 0 & 1 \end{bmatrix} \quad (2)$$

where
$R_{ee}^B$ is the angular rotation of the end effector defined in reference to the base coordinate frame,
$p_{ee}^B$ is the vector distance between the end effector and the origin of the base coordinate frame, and
θ is the set of all manipulator arm joint angles $θ_1, θ_2, \ldots θ_n$ As is known, the homogeneous transform facilitates finding of the position/orientation of a controlled end point of a manipulator arm in the base coordinate frame given the joint positions. The homogeneous transform is constructed by first constructing a homogenous transform for each joint of the manipulator arm. The transform for each joint will be s a 4×4 matrix containing the rotation matrix and position vector corresponding to the difference in orientation and position of two sequential coordinate frames attached to the arm, and can be represented as follows:

$$T_i^{i-1} = \begin{bmatrix} R_i^{i-1} & p_i^{i-1} \\ 0 & 0 & 0 & 1 \end{bmatrix} \quad (3)$$

where
$R_i^{i-1}$ is the rotation matrix, and
$p_i^{i-1}$ is the position vector.

Thereafter, the total homogenous transform for the entire manipulator arm (from the base to the controlled end point) can be constructed as follows by multiplying the homogenous transform constructed for each individual joint. This is represented below for an exemplary scenario in which there are four (4) joints interposed between a manipulator base and its controlled end point as defined by the end effector appliance:

$$T_{ee}^B = T_{ee}^4 \cdot T_4^3 \cdot T_3^2 \cdot T_2^1 \cdot T_1^B \quad (4)$$

where
$T_1^B$ is the transform for joint 1 relative to the coordinate frame of the base;
$T_2^1$ is the transform for joint 2 relative to the coordinate frame of joint 1;
$T_3^2$ is the transform for joint 3 relative to the coordinate frame of joint 2;
$T_4^3$ is the transform for joint 4 relative to the coordinate frame of joint 3; and
$T_{ee}^4$ is the transform for the end effector relative to the coordinate frame of joint 4.

As noted above, the homogenous transform matrix (2) includes $R_{ee}^B$ and $p_{ee}^B$. So it becomes a relatively simple matter to find the current position and orientation of the controlled end point from the resulting homogeneous transform for the manipulator arm. $R_{ee}^B$ is the angular rotation of the end effector defined in reference to the base coordinate frame, and $p_{ee}^B$ is the vector distance between the end effector tip (the controlled end point) and the origin of the base coordinate frame. Accordingly, this information can be extracted directly from the transform matrix.

Velocity kinematics (Jacobian matrix) facilitate determination of the controlled end point linear/angular velocity given the joint velocities and can be expressed as:

$$\dot{x}_{ee} = J\dot{θ}_{arm} \quad (5)$$

where $$J = \frac{\partial FK_{ee}}{\partial θ}$$

$\dot{x}_{ee}$ is the linear/angular velocity of the controlled end point given the joint velocities,
J is the Jacobian matrix for the manipulator arm,
$\dot{θ}_{arm}$ is the column vector of joint velocities of the arm, and
θ is the set of all manipulator arm joint angles $θ_1, θ_2, \ldots θ_n$ Joint limits for the manipulator are values which are conventionally expressed as maximum/minimum joint angles/positions. But in an embodiment disclosed herein, the limits are expressed more generally as a function:

$$f_0(θ)=1 \text{ or } f_0(θ)=0 \quad (6)$$

where the function returns 1 if the set of joint angles θ is allowable, and returns 0 if combination of joint angles is not allowable (e.g. due to collisions or joint travel limits).

In a manipulator control system disclosed herein, a control system 130 is provided with information concerning a plurality of different end effector appliances 114 that can be installed on a manipulator arm 102. More particularly, each end effector appliance is advantageously characterized in accordance with a set of parameters which include:
(1) position offset $p_i(D_i)$,
(2) rotation offset $R(D_i)_a^{re}$
(3) joint limits $f_i(θ, D_i)$, and
(4) one or more attachment use constraint functions $g_i(θ, D_i)$.
In the foregoing parameters,
θ is the set of all manipulator arm joint angles $θ_1, θ_2, \ldots θ_n$ and
$D_i$ is the set of all parameters $d_1, d_2, \ldots d_p$ which represent all possible position offsets variables for an $i_{th}$ end effector appliance.

Each of the foregoing parameters are discussed below in greater detail.

Figure 2:
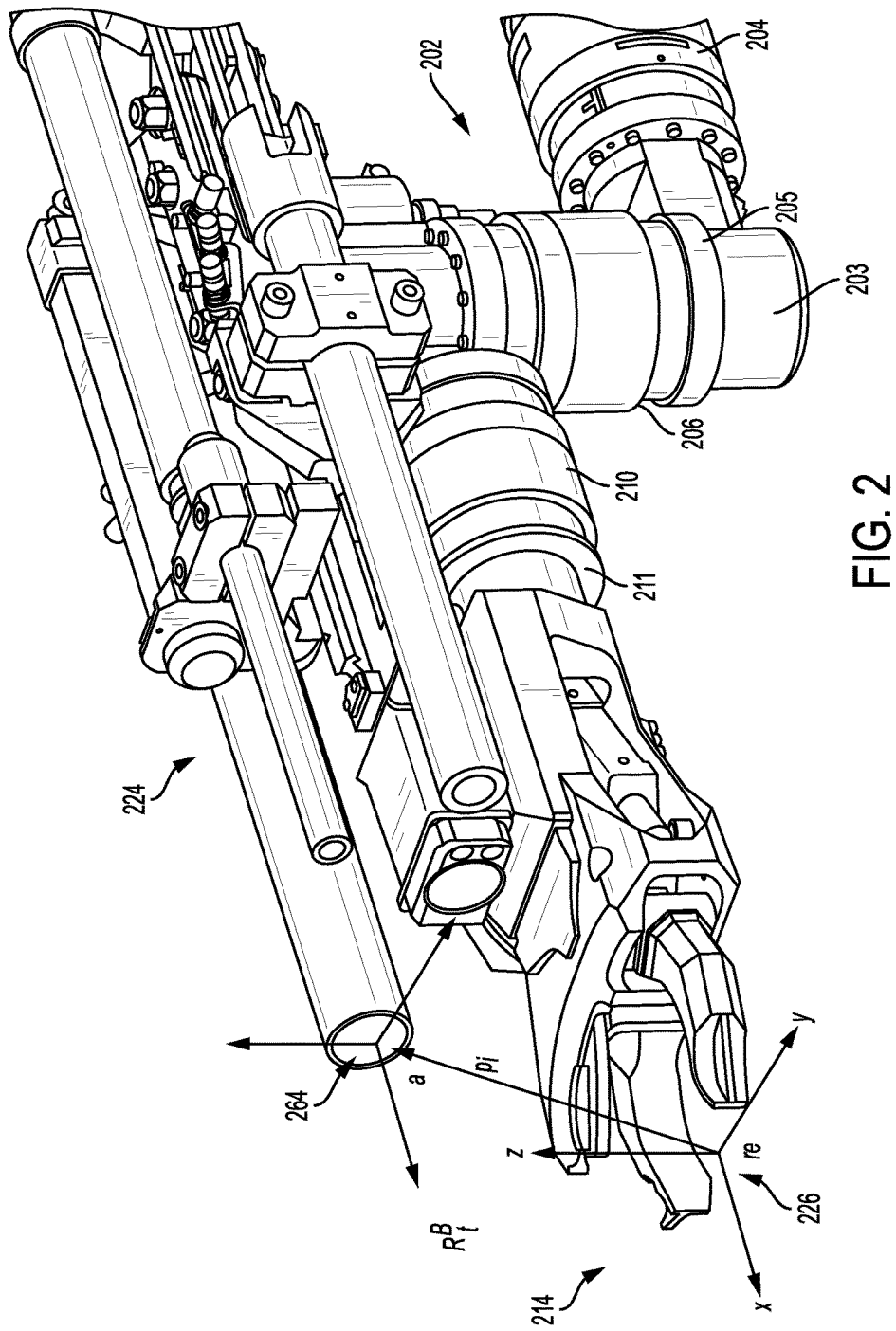
FIG. 2 is a drawing that is useful for understanding a difference in end position associated with different end effector appliances disposed on a manipulator arm.

The position offset $p_i(D_i)$ and rotation offset $R(D_i)_a^{re}$ parameters may be understood with reference to FIG. 2. As illustrated therein, an exemplary manipulator arm 202 can have a plurality of segments 204, 206, 210 which are movable relative to each other by means of a plurality of joints 205, 211. To avoid obscuring the embodiment described herein, less than all segments and joints are shown in FIG. 2.

The joints positions of the manipulator arm can be controlled by joint actuators (e.g. actuator 203) which are responsive to control signals from a control system (not shown in FIG. 2). As is known, various types of joint actuators are possible. Exemplary joint actuators used for this purpose can be electric motors, hydraulic pistons and pneumatic pistons, without limitation.

A grasping device 214 end effector appliance is installed on a distal end of the manipulator arm and is also controlled by the control system. In some embodiments, an end point 226 of the grasping device 214 can be define a reference end point of the manipulator arm 202. A reference coordinate frame can be defined with respect to this reference end point, with the reference end point 226 serving as the origin. Also shown installed on the manipulator arm in FIG. 2 is a second end effector appliance 224, which in this example is an explosive disruptor system.

It can be observed in FIG. 2 that a position offset $p_i$ is a vector distance between the reference end point 226 of a manipulator arm (e.g., a tip end of the grasping device) and a second end point 246 which is associated with a different type of end effector appliance 224. In some scenarios, the vector distance $p_i$ will be fixed and unchanging due to the fact that the second end effector appliance has a fixed mounting position on the manipulator arm. However, some end effector appliances can have a variable end point position relative to the reference end point.

Figure 3A:
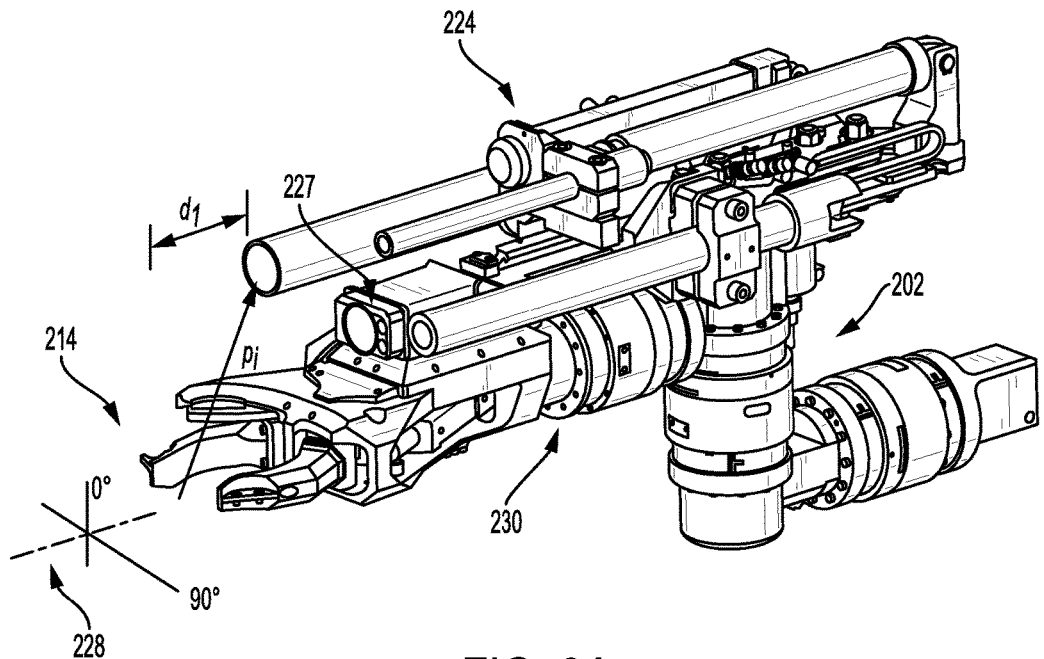
FIGS. 3A and 3B are a set of drawings that are useful for understanding how a portion of an end effector appliance disposed on a manipulator arm can be movably displaced with respect to its mounting location on the arm.
Figure 3B:
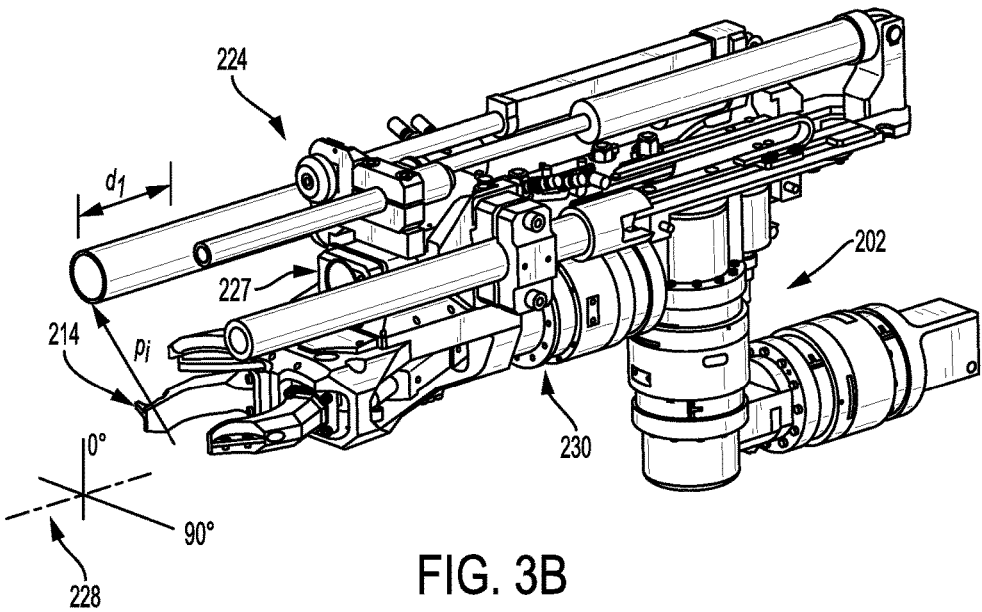

An example of this variable end point can be understood with reference to FIGS. 3A and 3B. Second end effector appliance 224 is capable of transitioning between a retracted configuration (FIG. 3A) and an extended configuration (FIG. 3B). Accordingly, the vector distance $p_i$ will necessarily change depending on whether the second end effector appliance 214 is in its retracted configuration or extended configuration, and the vector distance $p_i$ can be said to be a function of the disruptor displacement $d_1$.

In the example shown in FIGS. 3A and 3B, only a single displacement variable $d_1$ is needed to characterize the linear movement of the second end effector appliance 214. But in other scenarios involving different types of end effector appliances, a plurality of displacement variables may be needed to characterize the position configuration. So this set of displacement variables is represented herein by $D_i$ which is the set of all parameters $d_1, d_2, \ldots d_p$ which represent all possible displacement variables for a particular end effector appliance.

$D_i$ could potentially include vector displacement components aligned along the x, y, and/or z axis. Further, the displacement term $D_i$ can be a linear displacement, a rotational displacement, or a combination of the two. In this regard $D_i$ should be understood to be a general parameter (or collection of parameters) that describes any movement/displacement of the end effector appliance relative to its mounting location on the manipulator arm.

The rotational offset $R(D_i)_a^{re}$ similarly represents the end effector appliance rotation relative to the reference end point 226 coordinate frame. In some scenarios, this rotation offset can be with respect to single coordinate axis of the reference coordinate frame. However, embodiments are not limited in this regard and the rotation offset can also be defined with respect to a plurality of axes associated with the reference coordinate frame.

Notably, the position offset parameter and rotation offset parameter can be used to inform a control system how a controlled end point of a manipulator arm has changed from a reference end point 226 to a new modified end point 246 associated with a particular installed end effector appliance.

The joint limits $f_i(\theta, d_i)$ for the manipulator arm are advantageously expressed as a function of (1) $\theta$, which is the set of all manipulator arm joint angles $\theta_1, \theta_2, \ldots \theta_n$ and (2) the set comprised one or more displacement parameters which are collectively represented as $D_i$. In this regard it will be appreciated that displacements $D_i$ associated with a particular end effector appliance can potentially effect one or more joint limits.

Finally, a particular end effector appliance can have one or more constraint function(s) $g_i(\theta, D_i)$ associated therewith. Similar to the joint limits described above, a constraint function can be a function of the set of joint angles $\theta$ and the set of displacement variables $D_i$. The constraint function defines behaviors which are prohibited for a particular installed end effector appliance as a function of joint angles $\theta$ and the set of displacement variables $D_i$. Each constraint function can have a value of 0 or 1 depending on whether or not the constraint function is satisfied. More particularly, $g_i(\theta, D_i)=0$ if the set of joint angles and displacement variables are permitted, and $g_i(\theta, D_i)=1$ if the set of joint angles and displacement variables are prohibited.

The foregoing end effector parameters are determined in advance for each end effector appliance. Further, the parameters for each type of end effector can be stored in a memory associated with the control system. Thereafter, whenever a particular end effector appliance ($i^{th}$ end effector appliance) is installed on the manipulator arm, the user will identify it to the control system. Alternatively, the control system can automatically identify the installed end effector appliance by sensing the type of end effector appliance that has been installed. In such a scenario, an appliance attachment interface 402 could have one or more electrical contacts through which information concerning the type of end effector appliance can be communicated to the control system. For example, the electrical contacts in the attachment interface could connect to an electrical component (e.g. a resistor) provided in the end effector appliance. An electric current applied to the resistor by the control system could be used to measure the resistance value, where the measured resistance value specifies the type of end effector.

Once the control system has identified the particular type of end effector appliance which has been installed, the control system will access the parameter set associated with the particular installed end effector appliance so as to facilitate solving for a new forward kinematics and Jacobian matrix applicable to the particular $i^{th}$ end effector appliance. For example, the control system can access one or more parameter sets stored in a memory or data store associated with the control system.

Figure 4:
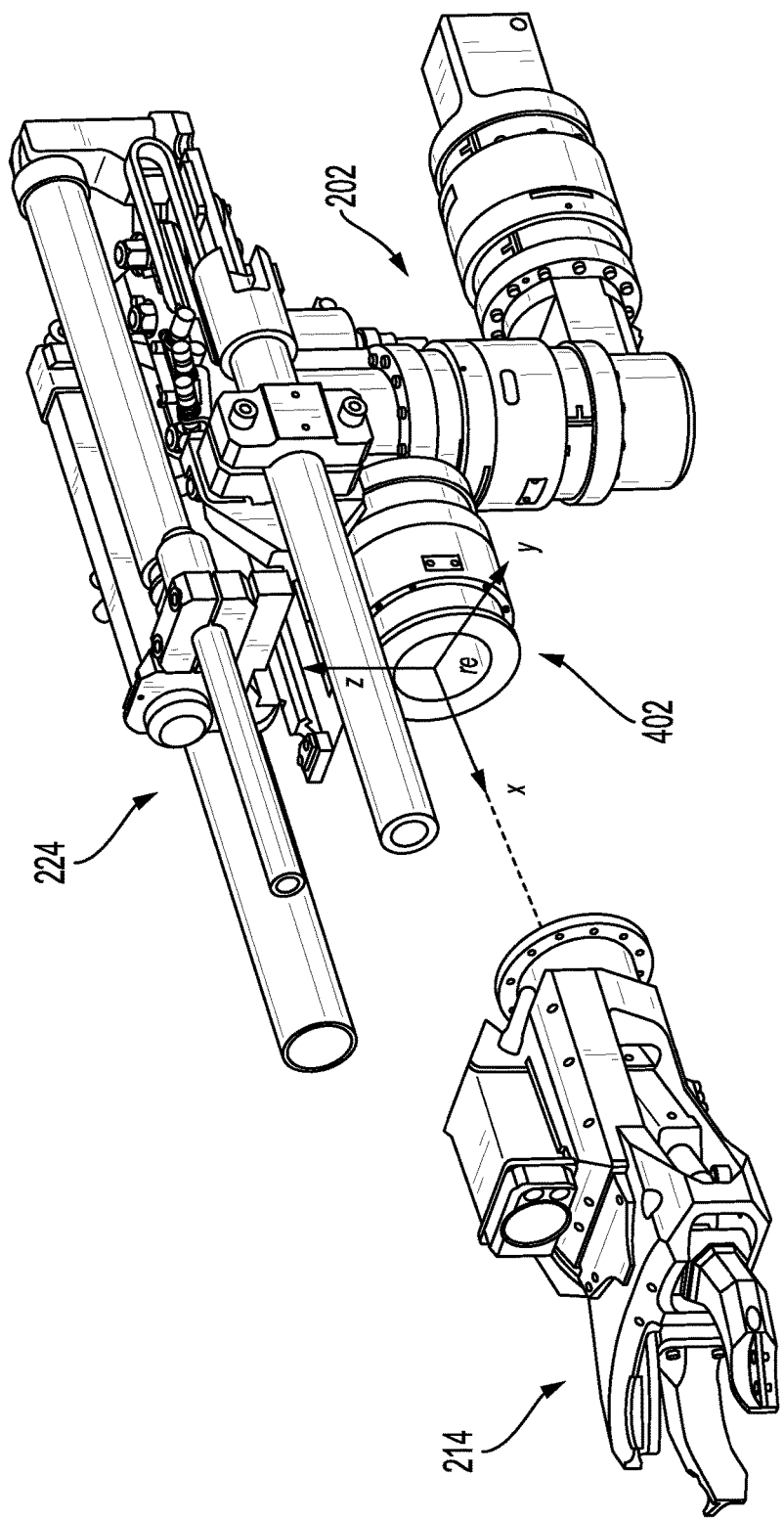
FIG. 4 is a drawing that is useful for understanding how an end effector mounting interface can define a reference end point for a control system.

As noted above with respect to FIG. 1, the homogenous transform matrix (2) for a conventional manipulator can be expressed as:

$$T_{ee}^B = \begin{bmatrix} R_{ee}^B & p_{ee}^B \\ 0 \quad 0 \quad 0 & 1 \end{bmatrix}$$

where ee denotes distal end 126 of the manipulator arm (including the grasping device). In such a scenario, the tip 226 of the end effector 114 is the controlled end point. In an embodiment herein, a new homogeneous transform matrix can be constructed for the controlled end point using a similar transform matrix $T_{re}^B$ where re more generally denotes a reference end point of the manipulator arm. The reference end point re could be an end effector tip end (e.g. end effector end point 226). However, in some scenarios, the grasping device 214 could itself be an interchangeable end effector of the manipulator arm. Such a scenario is shown in FIG. 4. In order to more generically specify a reference end point in such cases, the reference end point re can be defined at an appliance attachment interface 402 located at the distal end of the manipulator arm 202.

Once the particular location of the reference end point has been selected, a homogenous transform matrix $T_{re}^B$ can be constructed. The transform matrix $T_{re}^B$ will facilitate finding of the position/orientation of the reference end point re in the base coordinate frame (given the joint positions) and may be expressed as:

$$T_{re}^B = \begin{bmatrix} R_{re}^B & p_{re}^B \\ 0 \quad 0 \quad 0 & 1 \end{bmatrix} \quad (7)$$

where $R_{re}^B$ is the angular rotation of a predetermined reference end point re of the manipulator arm defined in reference to the base coordinate frame, $p_{re}^B$ is the vector distance between the predetermined reference end point re of the manipulator arm and the origin of the base coordinate frame.

Figure 5B:
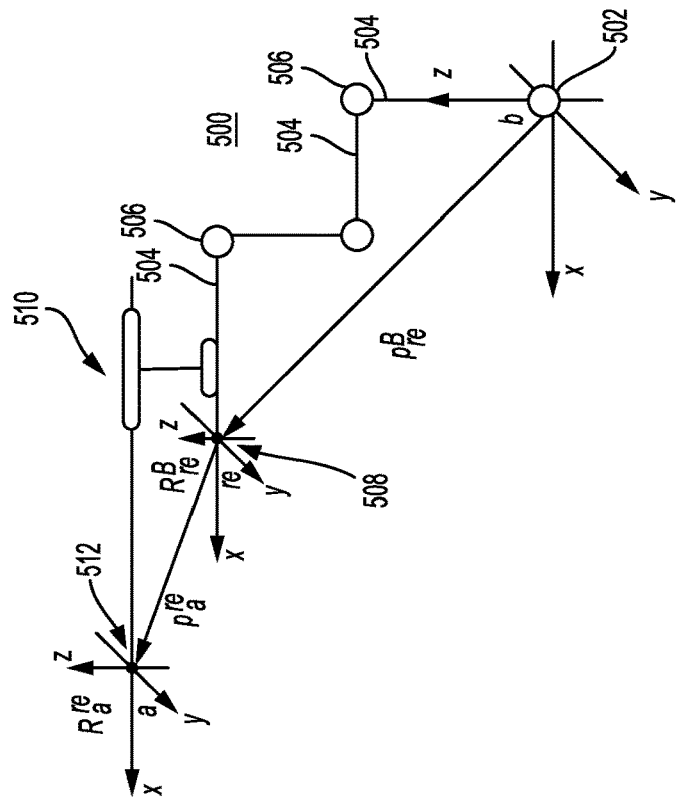
FIGS. 5A and 5B are a set of schematic drawings that are useful for understanding how the addition of an end effector appliance to a control arm can change a location of a distal end point of the arm relative to a base.
Figure 5A:
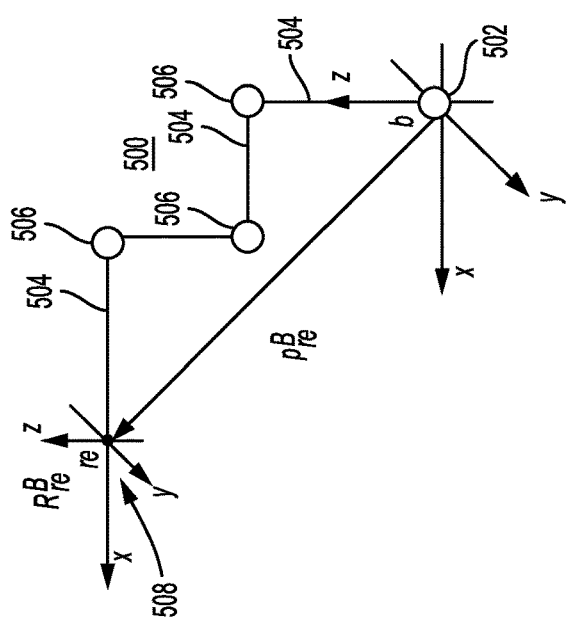

$R_{re}^B$ and $p_{re}^B$ can be understood in reference to FIG. 5A in which they are shown relative to a schematic representation of a manipulator arm 500 disposed on a base 502, having a plurality of segments 504 and joints 506 which terminate at a reference end point re indicated by reference number 508.

A similar homogenous transform matrix $T_a^{re}$ can be constructed to find the position/orientation of the end point of an $i^{th}$ end effector appliance 510 in the coordinate plane defined by the reference end point re, as follows:

$$T_a^{re} = \begin{bmatrix} R_a^{re} & p_a^{re} \\ 0 \quad 0 \quad 0 & 1 \end{bmatrix} \quad (8)$$

where $R_a^{re}$ is the angular rotation of a tip end a of an end effector appliance defined in reference to the reference end point (re) coordinate frame, $p_a^{re}$ is the vector distance between the tip end a of an end effector appliance defined in reference end point coordinate frame.

$R_a^{re}$ and $p_a^{re}$ are best understood with reference to FIG. 5B in which they are shown relative to a schematic representation of manipulator arm 500 disposed on a manipulator arm segment 504 and terminating at tip end a of an end effector appliance 510.

So after the user selects a new $i^{th}$ end effector appliance to be actively controlled, the control system can solve for a new forward kinematics $FK_a(\theta)$ and Jacobian matrix $J_a$ that is specific to that particular end effector appliance.

The two transform matrices $T_{re}^B$ and $T_a^{re}$ can be combined by multiplying to construct a homogenous transform matrix $T_a^B$, which facilitates finding the position/orientation of the end point of an $i^{th}$ end effector appliance a in the coordinate plane defined by the base:

$$FK_c(\theta): T_a^B = T_{re}^B \cdot T_a^{re} \quad (9)$$

$$J_c = \frac{\partial FK_c}{\partial \theta} \quad (10)$$

Accordingly, the control system can solve for a new forward kinematics $FK_c(\theta)$ and Jacobian matrix that is specific to that combination of manipulator arm and end effector appliance. In effect, the combination of the two transform matrices allows the controlled end point as understood by the control system to be modified in the control system algorithm from the reference end point (e.g. reference end point 226) to a new modified end point (e.g., second end point 246)

In an embodiment disclosed herein, the control system includes several aspects to facilitate a dynamic transition between different end effector appliances installed on a manipulator arm. One aspect of this process is a control law implemented by the control system which requires that the manipulator arm must be initialized to a set of joint angles that satisfy the appliance-specific motion constraint function(s). In other words all $g_i(\theta, d_i)=0$ indicate that the appliance-specific constraint function is satisfied (action is permitted) for each of m end effector appliances that are installed. This initialization can advantageously be performed once each end effector appliance to be installed on the manipulator arm has been identified to the control system, but before the m appliances are actually installed on the arm.

As an example of a constraint function, consider the scenario shown in FIGS. 3A and 3B. Before the end effector appliance 224 is moved from its retracted position (FIG. 3A) to its extended position (FIG. 3B), the grasping device 214 must be rotated to its 90° orientation as shown. This rotation prevents a camera 227 which is disposed on the manipulator arm, from interfering with the movement of the end effector appliance 224 as it moves on its rack from its retracted position to its extended position. In such a scenario we could have the following constraint function:

$$g_1(\theta, d_i) = (\theta_6 - 90°) * d_1$$

Where $\theta_6$ is a wrist joint 230 that determines rotation of the gripper device 214 about axis 228.

It can be observed in the foregoing equation that $g_1(\theta, d_1)$ is satisfied (i.e., $g_1(\theta, d_1)=0$) only if $\theta_6=90°$ (gripper is rotated to the required position to facilitate movement to the extended position) or $d_1=0$ (indicating the appliance is in the retracted position shown in FIG. 3A).

After the control system and manipulator arm have been initialized, a control system session with the selected end effector appliance can begin. Within the control system, the joint limit functions can be combined into a cumulative "total" joint limit function for the manipulator plus m attachments, as follows:

$$f_{total}(\theta, D_1, \ldots, D_m) = f_0(\theta) \cdot \Pi_{i=1}^m f_i(\theta, D_i)$$

where $f_{total}(\theta, D_1, \ldots, D_m)$ is the total joint limit function which specifies whether a manipulator attachment motion can (or cannot) be performed without encountering a manipulator arm limitation in the form of a collision among different parts of the manipulator arm, $\Pi_{i=1}^m f_i(\theta, D_i)$ is the product of all of the joint limit functions $f_0(\theta)$ is the standard joint limit function for the manipulator arm (which may or may not include a permanently mounted end effector appliance); and $f_i$ is the joint limit function for the manipulator arm with the $i^{th}$ end effector appliance installed.

Once the foregoing cumulative joint limit function has been determined, calculation of an optimal joint velocity command for the controlled end point is computed via constrained optimization. The constrained optimization minimizes the difference between controlled end point actions that are desired (commanded by the user) and manipulator arm actions or movements that are permitted, given the set of constraint functions $g_i(\theta, D_i)$ which are to be applied. The constrained optimization determines $\dot{\theta}$, which minimizes $\|W\dot{x}_{a,des} - WJ_i\dot{\theta}\|_2$ where:

$$\dot{\theta}_{opt} \text{ satisfies } \min\|\dot{x}_{a,des} - \dot{x}_{a,actual}\|_W = \min\|W\dot{x}_{a,des} - WJ_i\dot{\theta}_{opt}\|_2 \quad (12)$$

where $\dot{\theta}_{opt}$ is the set of optimal joint velocity commands for each of a plurality of manipulator arm joints, $\dot{x}_{a,des}$ is a desired or user commanded velocity of end point of an $i^{th}$ end effector appliance, $\dot{x}_{a,actual}$ is an actual velocity of an end point of an ith end effector appliance, $\|\dot{x}_{a,des}-\dot{x}_{a,actual}\|_W$ is the weighted magnitude of the vector difference between the actual and desired end point velocity, weighted in accordance with a weighting matrix W, which is equivalent to the following expression, where $\|\cdot\|_2$ denotes the 2-norm (Euclidean norm) function:

$$\|W\dot{x}_{a,des}-WJ_i\dot{\theta}_{opt}\|_2$$

where W is a weighting matrix, typically chosen to be $$W = \begin{bmatrix} w_1 & 0 & 0 \\ 0 & \ddots & 0 \\ 0 & 0 & w_6 \end{bmatrix}$$

where $w_1, w_2, \ldots w_6$ are values which numerically express the relative significance or importance to be accorded to each linear and rotation motion component of a motion command: $\dot{x}_{a,des}$. The weighting matrix is necessary because the units of vectors (e.g. $\dot{x}_{a,des}$) are typically mixed (e.g. linear velocity terms and angular velocity terms), and a weighting matrix is necessary to provide both relative weighting of the terms as well as conversion of all units to a consistent set of units in order to allow the 2-norm to be computed.

In the foregoing equation, the optimal joint velocity $\dot{\theta}_{opt}$ will be subject to the requirement that:

$g_i(\theta, D_i)=0$ for all $i \in [1, \ldots, m]$; meaning that not constraint function is violated, and $f_{total}(\theta, D_1, \ldots, D_m)=1$, meaning that no joint limit condition (which could result in a collision of different jointed segments of the manipulator arm) has been violated.

The optimization set forth above will depend at least in part on the form of the constraint functions $g_i(\theta, D_i)$ which has been selected. For example, in the scenario shown in FIG. 3B the constraint function would be solved by setting $\theta_6=90°$, solving for the remaining joint velocities via weighted pseudo-inverse, and then double-checking to ensure no joint limits are violated. If a joint limit is violated, then that joint velocity can be set to zero and the remainder of the solution can be re-calculated.

The proposed embodiments facilitate intuitive user control of a complex manipulator arm with a suite of attachments and tools. The control method allows any arbitrary combination of end effector appliances and easily accommodates the addition or removal of such appliances. As a further advantage, the method can facilitate automatic control of camera positions and views in accordance with one or more selected end effector appliances that have been installed. The camera views from available cameras associated with the control arm can be automatically selected based on the particular end effector that is installed on the manipulator arm. Accordingly, in an embodiment disclosed herein, the end effector parameters can further include camera parameters which specify one or more cameras to be used when a particular end effector appliance is installed.

The manipulator control system described herein can comprise one or more components such as a processor, an application specific circuit, a programmable logic device, or other circuit programmed to perform the functions described herein. Embodiments can be realized in one computer system or several interconnected computer systems. Any kind of computer system or other apparatus adapted for carrying out the methods described herein is suited. The computer system can have a computer program that can control the computer system such that it carries out the methods described herein.

Figure 6:
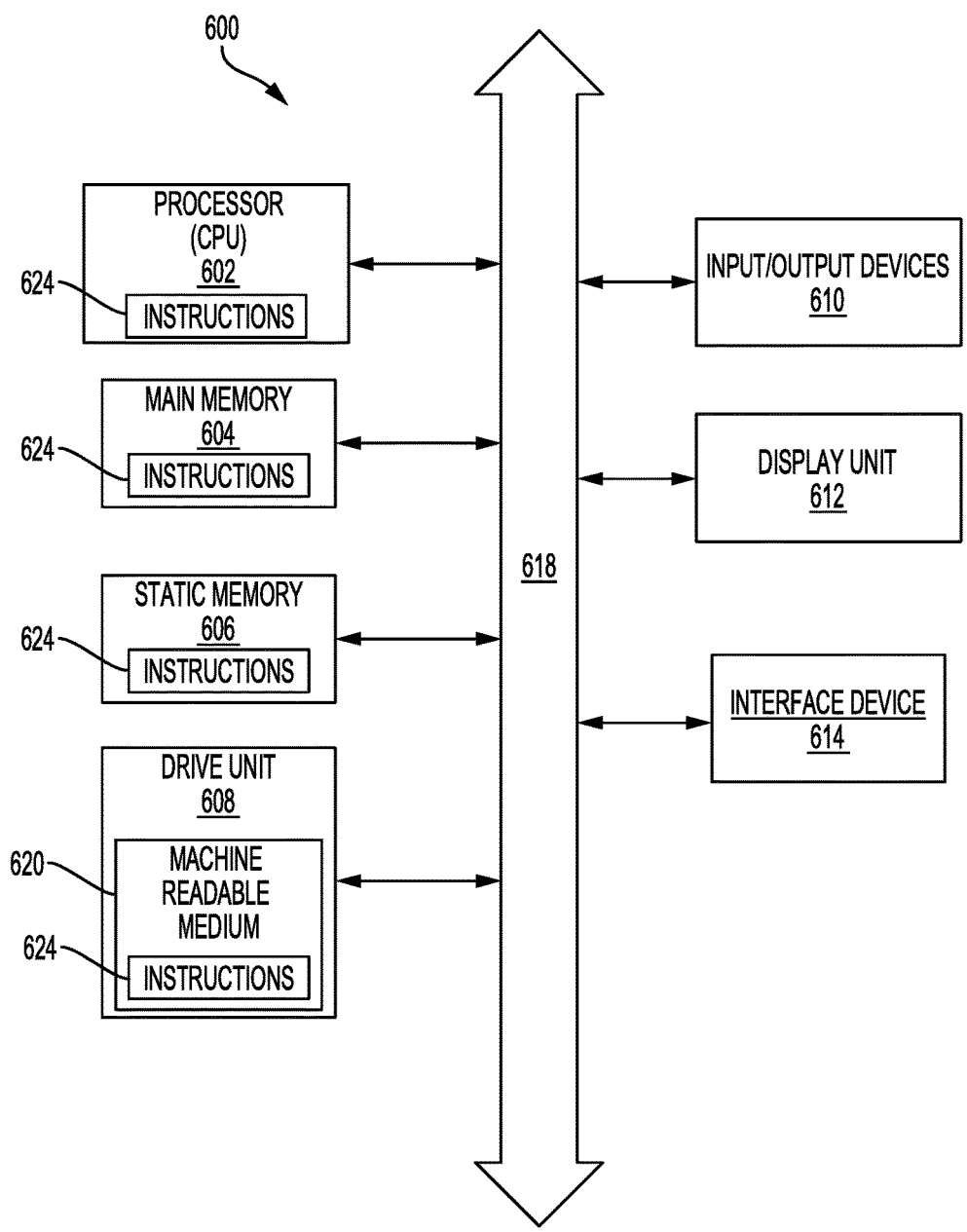
FIG. 6 is a block diagram of an exemplary computer system that can perform processing operations as described herein for purposes of implementing an overlay network.

Referring now to FIG. 6, there is shown a hardware block diagram comprising an exemplary manipulator control system 600. The machine can include a set of instructions which are used to cause the control system to perform any one or more of the methodologies discussed herein. In some embodiments the control system 600 can operate independently as a standalone device. However, embodiments are not limited in this regard and in other scenarios the control system can be operatively connected (networked) to other computing machines in a distributed environment to facilitate certain operations described herein. Accordingly, while only a single machine is illustrated it should be understood that embodiments can be taken to involve any collection of machines that individually or jointly execute one or more sets of instructions as described herein.

The control system 600 is comprised of a processor 602 (e.g. a central processing unit or CPU), a main memory 604, a static memory 606, a drive unit 608 for mass data storage and comprised of machine readable media 620, input/output devices 610, a display unit 612 (e.g. a liquid crystal display (LCD) or a solid state display, and an interface device 614. Communications among these various components can be facilitated by means of a data bus 618. One or more sets of instructions 624 can be stored completely or partially in one or more of the main memory 604, static memory 606, and drive unit 608. The instructions can also reside within the processor 602 during execution thereof. The input/output devices 610 can manipulator user interface (e.g. a joystick) for receiving user inputs for controlling the movement of a robot manipulator arm and one or more end effector appliances. The input/output devices can also include a keyboard, a mouse, a multi-touch surface (e.g. a touchscreen) and so on. The interface device 614 can be comprised of hardware components and software or firmware to facilitate wired or wireless network data communications with a manipulator arm in accordance with a communication protocol.

The drive unit 608 can comprise a machine readable medium 620 on which is stored one or more sets of instructions 624 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as referred to herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Control system 600 should be understood to be one possible example of a control system which can be used for controlling the operation of a manipulator arm. However, the embodiments are not limited in this regard and any other suitable control system architectures can also be used without limitation. Dedicated hardware implementations including, but not limited to, application-specific integrated circuits, programmable logic arrays, and other hardware devices can likewise be constructed to implement the methods described herein. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

We claim:

1. A robotic manipulator, comprising:
    a base on which is mounted a manipulator arm comprised of a plurality of segments respectively connected by a plurality of joints which facilitate movement of the plurality of segments relative to the base responsive to one or more joint actuators;
    the manipulator arm having an end portion distal from the base to which one or more of a plurality of end effector appliances can be operably mounted for performing one or more manipulator arm operations;
    a control system which controls the operation of the joint actuators, and has access to a plurality of different end effector appliance parameter sets which are respectively associated with the plurality of different end effector appliances; and
    at least one interface which facilitates identification to the control system of one or more of the plurality of different end effector appliances which are installed on the manipulator arm;
    wherein said control system is responsive to the identification to dynamically modify a control algorithm which is used to control the plurality of joint actuators.

2. The robotic manipulator according to claim 1, wherein said manipulator arm has a controlled end point which is associated with the end portion of the manipulator arm or an end effector attached thereto, and the control system is configured to use the controlled end point as a basis to translate manipulator arm control signals received from a user interface to control signals which are communicated to the plurality of joint actuators.

3. The robotic manipulator according to claim 2, wherein the dynamic modification of the control algorithm automatically changes at least one of a location and an orientation of the controlled end point as recognized by the control system from a reference end point to a modified end point.

4. The robotic manipulator according to according to claim 3, wherein the modified end point is determined in accordance with an installed end effector appliance parameter set corresponding to a particular one of the plurality of end effector appliances which has been identified to the control system as having being installed on the manipulator arm.

5. The robotic manipulator according to claim 4, wherein the change in at least one of the location and the orientation of the controlled end point are respectively specified by a position offset parameter and a rotation offset parameter which are included in the installed end effector appliance parameter set.

6. The robotic manipulator according to claim 5, wherein at least one of the position offset parameter and the rotation offset parameter are functionally dependent on a variable displacement of a portion of the end effector appliance relative to the end portion of the manipulator arm, the variable displacement specified in accordance with one or more displacement parameters.

7. The robotic manipulator according to claim 6, wherein the location of the controlled end point which is used by the control algorithm for joint actuator control functions is dynamically variable in accordance with the variable displacement.

8. The robotic manipulator according to claim 6, wherein:
    the installed end effector appliance parameter set further comprises a joint limit set comprised of one or more joint limits pertaining to the joints of the manipulator arm when the installed end effector appliance is mounted on the end portion thereof, and
    the one or more of the joint limits are functionally dependent on
        $\theta$ which is the set of all manipulator arm joint angles $\theta_1$, $\theta_2$, ... $\theta_n$, and
        the one or more of the displacement parameters.

9. The robotic manipulator according to claim 8, wherein the control system limits the movement of the joints comprising the manipulator arm so that there is no violation of joint limits specified by the combination of
    the joint limit set for the installed end effector appliance; and
    a standard joint limit set for the manipulator arm in the absence of the installed end effector appliance.

10. The robotic manipulator according to claim 8, wherein the installed end effector appliance parameter set further comprises a constraint function set comprised of one or more constraint functions which specify conditions under which certain displacement operations are permitted, wherein the one or more constraint functions are functionally dependent on θ which is the set of all manipulator arm joint angles $\theta_1$, $\theta_2$, ... $\theta_n$, and
the one or more of the displacement parameters.

11. The robotic manipulator according to claim 10, wherein the control system is configured to calculate an optimal joint velocity command for controlling the one or more joint actuators, the optimal joint velocity command determined by a constrained optimization which minimizes the difference between actions that are commanded through a user interface and actions that are permitted for the manipulator arm, given the set of constraint functions which are to be applied.

12. A method to facilitate transitions among a plurality of end effectors in a robotic manipulator, comprising:
providing a base on which is mounted a manipulator arm comprised of a plurality of segments respectively connected by a plurality of joints which facilitate movement of the plurality of segments relative to the base responsive to one or more joint actuators;
providing as part of the manipulator arm an end portion distal from the base to which one or more of a plurality of end effector appliances can be operably mounted for performing one or more manipulator arm operations;
controlling the operation of the joint actuators using a control system;
providing the control system with access to a plurality of different end effector appliance parameter sets stored in a data store which are respectively associated with the plurality of different end effector appliances; and
receiving in the control system an identification of one or more of the plurality of different end effector appliances which are selectively removably installed on the manipulator arm;
responsive to the identification, dynamically modifying at least one control algorithm of the control system which is used to control the plurality of joint actuators.

13. The method according to claim 12, wherein said manipulator arm has a controlled end point which is associated with the end portion of the manipulator arm or an end effector attached thereto, and the control system is configured to use the controlled end point as a basis to translate manipulator arm control signals received from a user interface to control signals which are communicated to the plurality of joint actuators.

14. The method according to claim 13, wherein the dynamic modification of the control algorithm automatically changes at least one of a location and an orientation of the controlled end point as recognized by the control system from a reference end point to a modified end point.

15. The method according to according to claim 14, wherein the modified end point is determined in accordance with an installed end effector appliance parameter set corresponding to a particular one of the plurality of end effector appliances which has been identified to the control system as having being installed on the manipulator arm.

16. The method according to claim 15, wherein the change in at least one of the location and the orientation of the controlled end point are respectively specified by a position offset parameter and a rotation offset parameter which are included in the installed end effector appliance parameter set.

17. The method according to claim 16, wherein at least one of the position offset parameter and the rotation offset parameter are functionally dependent on a variable displacement of a portion of the end effector appliance relative to the end portion of the manipulator arm, the variable displacement specified in accordance with one or more displacement parameters.

18. The method according to claim 17, wherein the location of the controlled end point which is used by the control algorithm for joint actuator control functions is dynamically variable in accordance with the variable displacement.

19. The method according to claim 17, wherein:
the installed end effector appliance parameter set further comprises a joint limit set comprised of one or more joint limits pertaining to the joints of the manipulator arm when the installed end effector appliance is mounted on the end portion thereof, and
the one or more of the joint limits are functionally dependent on
θ which is the set of all manipulator arm joint angles $\theta_1$, $\theta_2$, ... $\theta_n$, and
the one or more of the displacement parameters.

20. The method according to claim 19, wherein the control system limits the movement of the joints comprising the manipulator arm so that there is no violation of joint limits specified by the combination of
the joint limit set for the installed end effector appliance; and
a standard joint limit set for the manipulator arm in the absence of the installed end effector appliance.

21. The method according to claim 19, wherein
the installed end effector appliance parameter set further comprises a constraint function set comprised of one or more constraint functions which specify conditions under which certain displacement operations are permitted, wherein the one or more constraint functions are functionally dependent on
θ which is the set of all manipulator arm joint angles $\theta_1$, $\theta_2$, ... $\theta_n$, and
the one or more of the displacement parameters.

22. The method according to claim 21, wherein the control system is configured to calculate an optimal joint velocity command for controlling the one or more joint actuators, the optimal joint velocity command determined by a constrained optimization which minimizes the difference between actions that are commanded through a user interface and actions that are permitted for the manipulator arm, given the set of constraint functions which are to be applied.

* * * * *